(12) United States Patent
Yuasa et al.

(10) Patent No.: US 7,401,678 B2
(45) Date of Patent: Jul. 22, 2008

(54) ELECTRIC POWER STEERING SYSTEM

(75) Inventors: Susumu Yuasa, Osaka (JP); Yoshiaki Takagi, Nara (JP); Etsuro Kitami, Nara (JP)

(73) Assignee: Jtekt Corporation, Osaka-shi, Osaka (JP)

( * ) Notice: Subject to any disclaimer, the term of this patent is extended or adjusted under 35 U.S.C. 154(b) by 392 days.

(21) Appl. No.: 11/305,334

(22) Filed: Dec. 19, 2005

(65) Prior Publication Data

US 2006/0169528 A1 Aug. 3, 2006

(30) Foreign Application Priority Data

Dec. 20, 2004 (JP) ............................ P2004-368118

(51) Int. Cl.
*B62D 5/04* (2006.01)
(52) U.S. Cl. ...................................... 180/444; 180/443
(58) Field of Classification Search .................. 180/443, 180/444
See application file for complete search history.

(56) References Cited

U.S. PATENT DOCUMENTS

| | | | |
|---|---|---|---|
| 6,832,661 B2* | 12/2004 | Palfenier et al. | 180/444 |
| 6,851,510 B2* | 2/2005 | Furumi et al. | 180/445 |
| 2004/0182188 A1* | 9/2004 | Nakamura et al. | 74/409 |
| 2007/0299521 A1* | 12/2007 | Glenn et al. | 623/17.11 |

FOREIGN PATENT DOCUMENTS

| | | |
|---|---|---|
| EP | 1 433 688 A2 | 6/2004 |
| JP | 2002-145082 | 5/2002 |
| JP | 2004-203154 | 7/2004 |

OTHER PUBLICATIONS

European search report dated Apr. 21, 2006.

* cited by examiner

*Primary Examiner*—J. Allen Shriver
*Assistant Examiner*—Tashiana Adams
(74) *Attorney, Agent, or Firm*—McGinn IP Law Group, PLLC

(57) ABSTRACT

A curved leaf spring which is a first urging member surrounds an outer wheel of a second bearing, and urges, through the second bearing, a second end of a worm shaft in a direction in which the distance between the center of the worm shaft and the center of a worm wheel is shortened. A second urging member includes an annular support member received by an end surface of the outer wheel and a plurality of elastic pins extending in a direction in parallel with the axial direction of a support member. The elastic pins have fixed ends fixed to the support member and free ends that come into elastic contact with an end wall of a housing.

7 Claims, 8 Drawing Sheets

ELECTRIC POWER STEERING SYSTEM

BACKGROUND OF THE INVENTION

This invention is related to an electric power steering system which produces a steering assisting force by an electric motor.

An electric power steering system (EPS) for automobiles employs a reduction mechanism. In a column type EPS, for example, the revolution of the output shaft of the electric motor is reduced through a worm shaft and a worm wheel, whereby the output of the electric motor is amplified and is transmitted to a steering mechanism to assist the torque in the steering operation.

A suitable degree of backlash is necessary for the meshing between the worm shaft and the worm wheel. When, for example, traveling on a rough road, however, there may generate teeth-hitting sound (rattling sound) due to the backlash reversely input from the road surface.

To suppress the generation of teeth-hitting sound, it becomes necessary to strictly adjust the amount of backlash that occurs between the worm shaft and the worm wheel within a range of machining precision of the parts. In assembling the worm shaft and the worm wheel, so far, it is a practice to select the individual parts depending upon the degree of dispersion in the dimensional precision and assemble those which assume suitable degrees of precision when combined together (so-called matching assembly) requiring, however, very laborious work and boosting up the cost of production.

Further, even if the backlash may, at first, have been set in a suitable range owing to the matching assembly, the backlash increases due to wear of the teeth after aging producing abnormal sound.

Therefore, there has been proposed an art for decreasing the backlash by permitting the bearing that supports an end of the worm shaft to advance or retreat to or from the worm wheel in the radial direction, urging the end of the worm shaft toward the worm wheel in the radial direction by using a curved leaf spring that is covering the periphery of the outer wheel of the bearing, and automatically adjusting the distance between the center of rotation of the worm shaft and the center of rotation of the worm wheel (so-called inter-core distance) (see, for example, patent document 1).

There has further been proposed an art for adjusting the backlash by converting part of the urging force of the compression coil spring that urges the worm shaft in the axial direction into an urging force for urging the worm shaft toward the worm wheel in the radial direction (see, for example, patent document 2).

Patent document 1: JP-A-2004-203154
Patent document 2: JP-A-2002-145082

According to the former publication, however, the curved leaf spring often rattles due to the clearance in a direction other than the urging direction. In this case, the rotational torque of the worm shaft fluctuates and the durability of the curved leaf spring decreases. There further remain problems in that sliding sound or hitting sound is generated between the worm shaft and the worm wheel, or hitting noise is generated between the curved leaf spring and the housing.

According to the latter publication, on the other hand, the urging force is obtained in two directions by using a single compression coil spring. Therefore, the structure of the cam mechanism tends to become complex and the operation tends to lose stability.

SUMMARY OF THE INVENTION

This invention was accomplished in view of the above problems and its object is to provide an electric power steering system which produces little noise, features excellent durability and permits the torque to fluctuate little.

In order to solve the aforesaid object, the invention is characterized by having the following arrangement.

(1) An electric power steering system which transmits power of an electric motor for assisting a steering to a steering mechanism via a transmission device that includes a drive gear and a driven gear in mesh with the drive gear, the electric power steering system comprising:

a bearing that rotatably supports an end of the drive gear in an axial direction thereof;

a housing that includes a support hole for supporting the bearing in such a manner to be deviated in a direction in which a distance between an axial center of drive gear and an axial center of the driven gear varies;

a first urging member that elastically urges the drive gear via the bearing in a direction in which the distance between the axial centers of the drive gear and the driven gear is shortened; and a second urging member that includes a plurality of elastic pins arranged in a circumferential direction of the bearing for elastically urging the bearing in the axial direction.

(2) The electric power steering system according to (1), wherein the second urging member includes an annular support member, and the elastic pins have fixed ends fixed to the support member and free ends.

(3) The electric power steering system according to (2), wherein the second urging member including the annular support member and the elastic pins is interposed between an end surface of the bearing and an opposed portion of the housing opposed to the bearing.

(4) The electric power steering system according to (3), wherein the support member is received by the end surface of the bearing, and the free ends of the elastic pins are brought into elastic contact with the opposed portion.

(5) The electric power steering system according to (3), wherein the support member is received by the opposed portion, and the free ends of the elastic pins are brought into elastic contact with the end surface of the bearing.

(6) The electric power steering system according to (1) further comprising a disk-shape covering member for closing an opening formed in the housing, wherein the elastic pins have fixed ends fixed to the covering member and free ends that come into elastic contact with the end surface of the bearing.

(7) The electric power steering system according to (1), wherein the free ends of the elastic pins are of a round shape.

In this invention, the drive gear is urged in a direction in which the distance is shorted between the centers to decrease the amount of backlash in a portion where the drive gear meshes the driven gear. As a result, noise due to teeth-hitting sound can be decreased. Further, rattling of the drive gear in the axial direction is suppressed by the second urging member thereby to suppress the first urging member from rattling in the axial direction of the drive gear. It is therefore made possible to suppress a drop in the durability of the first urging member caused by rattling of the first urging member and to suppress the generation of noise caused by the hitting sound. Further, a fluctuation in the rotational torque of the drive gear can be suppressed.

1: electric power steering system, 2: steering member, 3: steering shaft, 5: intermediate shaft, 7: pinion shaft, 8: rack-bar, A: rack-and-pinion mechanism (steering mechanism), 16—electric motor, 17: reduction gear (transmission device), 17a: housing, 17b: end wall, 18: worm shaft (drive gear), 18b: second end portion (end), 19: worm wheel (driven gear), C1, C2: centers of rotation, D1: distance between centers, X1: direction in which the distance between centers is lengthened, X2: distance in which the distance between centers is shortened, 20: output shaft, 21: power transmission joint, 23: second bearing, 25: inner wheel, 27: outer wheel, 27a: end surface, 29: bearing-holding hole (support hole), 30: curved leaf spring (first urging member), 31: main portion, 31a; first end, 31b: second end, 32: rotation-limiting portions, 33: elastic tongue, 60, 60A: second urging members, 61: support member, 62: elastic pins, 62a: fixed ends, 62b: free ends, 63: opening, 64: covering member, 65: elastic pins, 65a: fixed ends, 65b: free ends

DETAILED DESCRIPTION OF PREFERRED EMBODIMENTS

Preferred embodiments of the invention will now be described with reference to the accompanying drawings.

Figure 1:
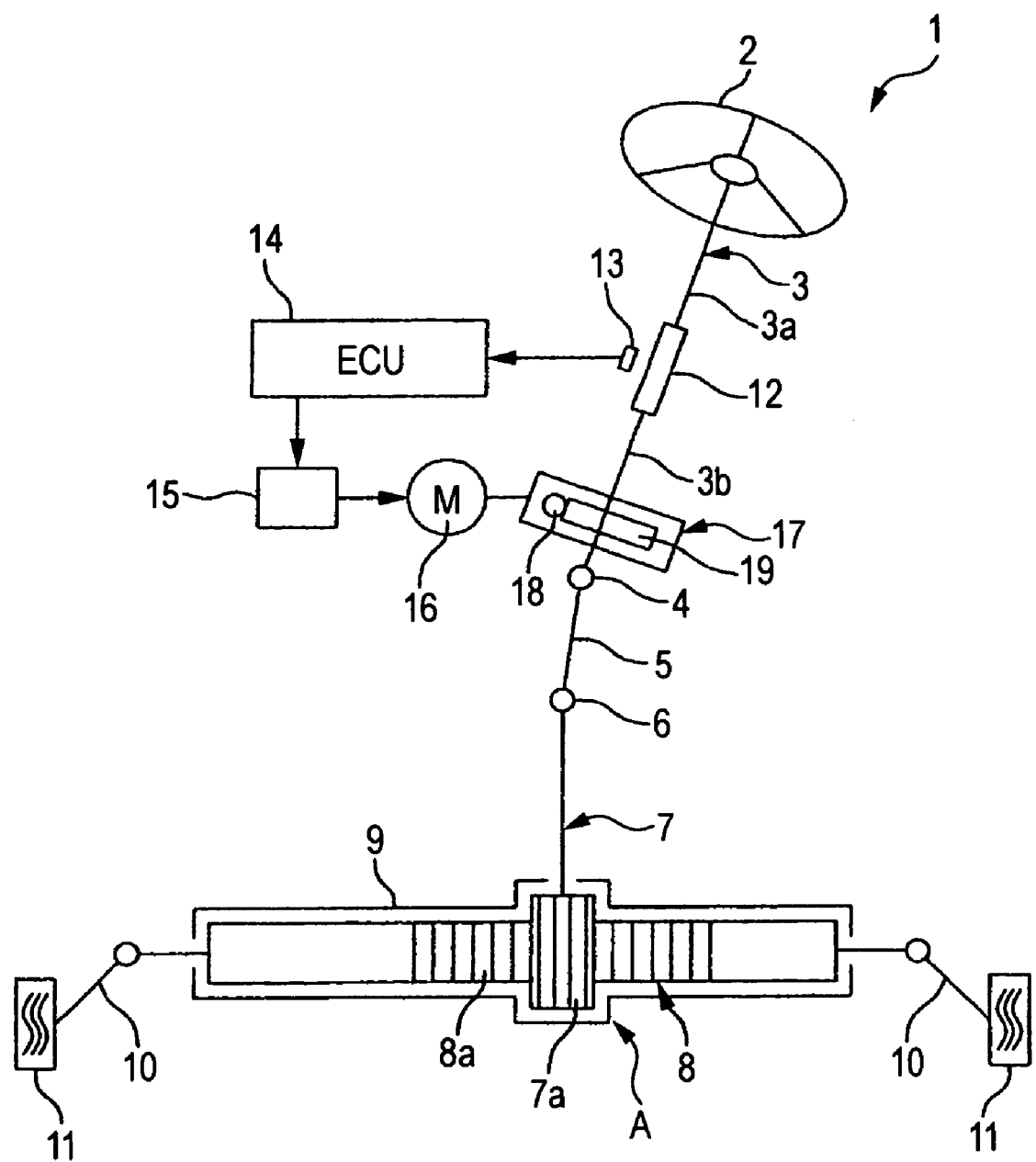
FIG. 1 is a diagram schematically illustrating the constitution of an electric power steering system according to an embodiment of the invention.

Embodiments of the invention will be described with reference to the accompanying drawings. FIG. 1 is a view schematically illustrating the constitution of an electric power steering system according to an embodiment of the invention.

Referring to FIG. 1, the electric power steering system 1 includes a steering shaft 3 coupled to a steering member 2 such as a steering wheel, an intermediate shaft 5 coupled to the steering shaft 3 via a universal joint 4, a pinion shaft 7 coupled to the intermediate shaft 5 via a universal joint 6, and a rack bar 8 having rack teeth 8a that mesh with pinion teeth 7a provided near an end of the pinion shaft 7 and serving as a steering shaft extending in the right-and-left direction of an automobile. The pinion shaft 7 and the rack bar 8 constitute a steering mechanism A of a rack-and-pinion mechanism.

The rack bar 8 is supported in a housing 9 fixed to the chassis so as to linearly and reciprocally move via a plurality of bearings that are riot shown. Both ends of the rack bar 8 protrude toward both ends of the housing 9, and tie rods 10 are coupled to the ends thereof. The tie rods 10 are coupled to the corresponding wheels 11 via corresponding knuckle arms (not shown).

When the steering member 2 is operated to rotate the steering shaft 3, the rotation is converted, through the pinion teeth 7a and the rack teeth 8a, into a linear motion of the rack bar 8 along the right-and-left direction of the automobile. Thus, the wheels 11 can be steered.

The steering shaft 3 is divided into an upper shaft 3a of the input side coupled to the steering member 3 and a lower shaft 3b of the output side coupled to the pinion shaft 7. The upper and lower shafts 3a and 3b are coupled together via a torsion bar 12 so as to rotate relative to each other on the same axis.

A torque sensor 13 is provided to detect the steering torque depending upon the amount of change in the rotation between the upper shaft 3a and the lower shaft 3b that rotate relative to each other via the torsion bar 12. The detected result of torque of the torque sensor 13 is given to the ECU (electronic control unit) 14. Based upon the detected result of torque and the detected result of vehicle speed from a vehicle speed sensor that is not shown, the ECU 14 controls an electric motor 16 for assisting the steering via a drive circuit 15. The rotational output of the electric motor 16 is reduced through a reduction mechanism 17 which works as a transmission device, is transmitted to the pinion shaft 7, and is converted into a linear motion of the rack bar 8 to assist the steering.

The reduction mechanism 17 includes a worm shaft 18 serving as a drive gear driven by the electric motor 16, and a worm wheel 19 which is a driven gear in mesh with the worm shaft 18 and is coupled to the lower shaft 3b of the steering shaft 3 so as to rotate integrally therewith.

Figure 2:
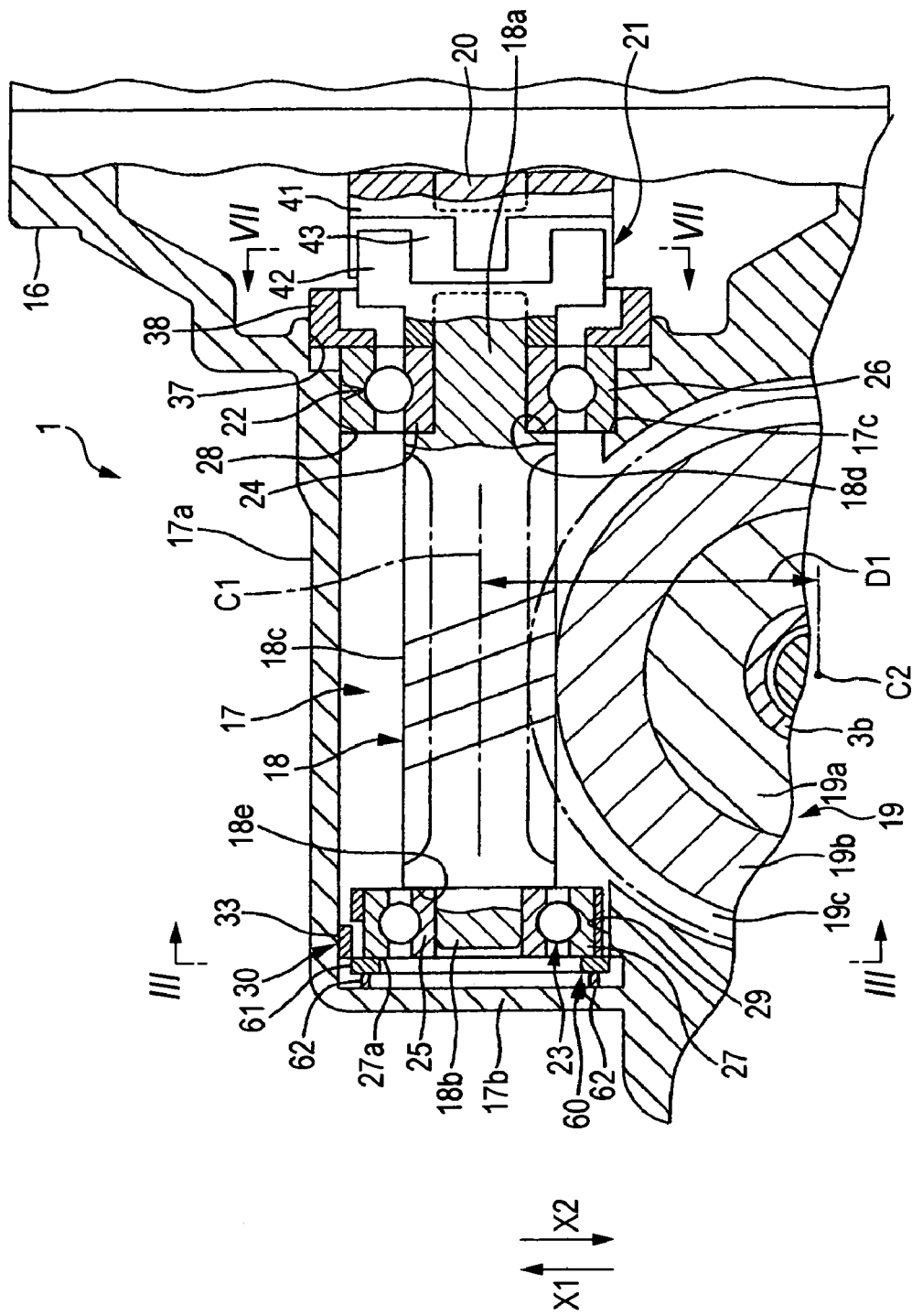
FIG. 2 is a sectional view illustrating a major portion of the electric power steering system.

Referring to FIG. 2, the worm shaft 18 is arranged in concentric with the output shaft 20 of the electric motor 16. The worm shaft 18 has a first end 18a and a second end 18b separated apart in the axial direction thereof, and has a teeth portion 18c at an intermediate portion thereof between the first end 18a and the second end 18b.

The worm wheel 19 is coupled to an intermediate portion in the axial direction of the lower shaft 3b of the steering shaft 3 so as to rotate integrally therewith but being inhibited from moving in the axial direction. The worm wheel 19 includes an annular core metal 19a coupled to the lower shaft 3b so as to rotate integrally therewith, and a synthetic resin member 19b surrounding the core metal 19a and forming teeth 19c on the outer periphery thereof. The core metal 19a is inserted in a metal mold, for example, at the time of molding the synthetic resin member 19b.

The first end 18a of the worm shaft 18 and the opposing end of the output shaft 20 of the electric motor 16 are coupled together in concentric via a power transmission joint 21 so as to transmit the power.

The first and second ends 18a, 18b of the worm shaft 18 are supported by the housing 17a of the reduction gear 17 so as to rotate via corresponding first and second bearings 22 and 23. The first and second bearings 22 and 23 are, for example, ball bearings.

Inner wheels 24 and 25 of the first and second bearings 22, 23 are fitted to the first and second ends 18a, 18b of the worm shaft 18 so as to rotate integrally therewith. The inner wheels 24, 25 are in contact with the corresponding and oppositely directed positioning steps 18d and 18e of the worm shaft 18. Outer wheels 26 and 27 of the first and second bearings 22, 23 are held by the corresponding bearing-holding holes 28 and 29 of the housing 17a of the reduction gear 17.

The bearing-holding hole 29 (support hole) for the second bearing 23 is formed in a deviated shape to so hold the second bearing 23 that it can be deviated in the directions X1 and X2 in which the distance D1 between the center of the worm shaft 18 and the center of the worm wheel 19 (corresponds to a distance between the center C1 of rotation of the worm shaft 18 and the center C2 of rotation of the worm wheel) can be lengthened and shortened. A curved leaf spring 30 which is a first annular urging member is interposed between the inner peripheral surface of the bearing-holding hole 29 and the outer peripheral surface of the outer wheel 27 of the second bearing 23. The curved leaf spring 30 urges the second bearing 23 in the direction X2 in which the distance D1 between the above centers is shortened.

Figure 3:
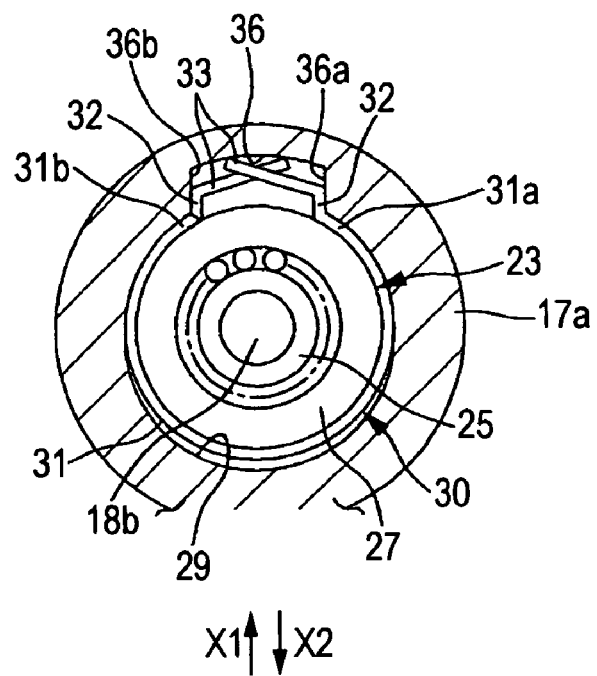
FIG. 3 is a sectional view along the line III-III in FIG. 2.
Figure 4:
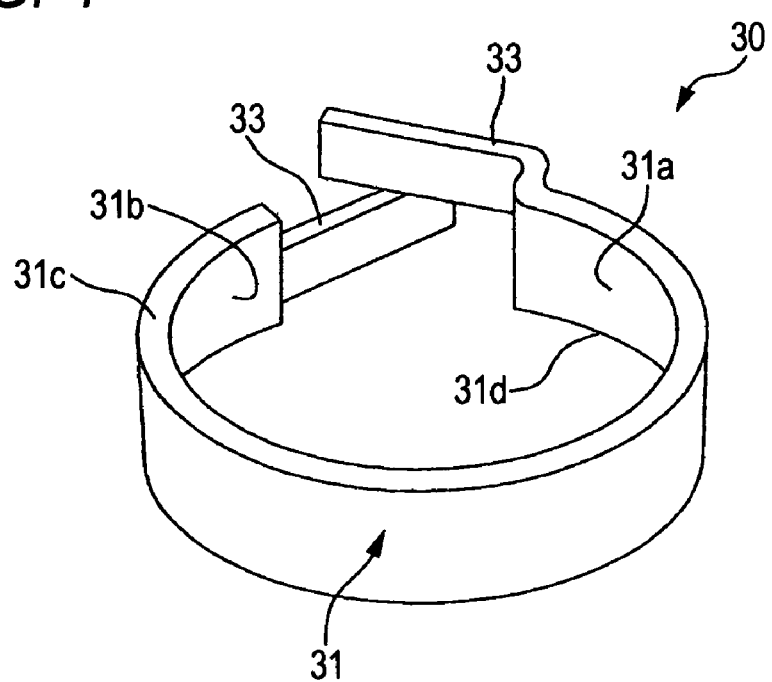
FIG. 4 is a perspective view of a curved leaf spring for urging a worm shaft in the radial direction.

The curved leaf spring 30 which is the first urging member is a thin plate member formed by, for example, plate working. Referring to FIGS. 3 and 4 which are sectional views along the line III-III in FIG. 2, the curved leaf spring 30 includes an annular main portion 31 having ends surrounding the outer circumference of the outer wheel 27 of the second bearing 23, a pair of rotation-limiting portions 32 formed at the first and second ends 31a, 31b which are the ends in the circumferential direction of the main portion 31, and a pair of cantilevered elastic tongue pieces 33 extending from the rotation-limiting portions 32.

The rotation-limiting portions 32 have a width narrower than the width of the rain portion 31. One of the pair of elastic tongue pieces 33 is arranged on the side of a first side edge 31c, and the other elastic tongue piece 33 is arranged on the side of a second side edge 31d at different levels.

Referring again to FIG. 3, the elastic tongue pieces 33 of the curved leaf spring 30 are received by the bottom of a recessed receiving portion 36 formed in a portion of the inner peripheral surface of the bearing-holding hole 29, and urging forces of the elastic tongue pieces 33 are urging the second end 18b of the worm shaft 18 via the second bearing 23 in the direction X2 in which the distance D1 between the above centers is shortened.

The recessed receiving portion 36 has a pair of inner walls 36a and 36b facing in the circumferential direction of the bearing-holding hole 29, and the rotation-limiting portions 32 of the curved leaf spring 30 are brought into contact with the corresponding inner walls 36a and 36b to limit the curved leaf spring 30 from rotating in the circumferential direction of the bearing-holding hole 29.

Referring to FIG. 2, a second urging member 60 is interposed between the end surface 27a of the outer wheel 27 of the second bearing 23 and the end wall 17b of the housing 17a which serves as an opposing member to elastically urge the worm shaft 18 toward the electric motor 16 in the axial direction via the second bearing 23.

The second urging member 60 includes an annular support member 61 received by the end surface 27a of the outer wheel 27 of the second bearing 23 and a plurality of elastic pins 62 extending in a direction in parallel with the axial direction of the support member 61. The support member 61 is made of a metal or a resin, and the elastic pin 62 is made of a rubber.

Figure 5:
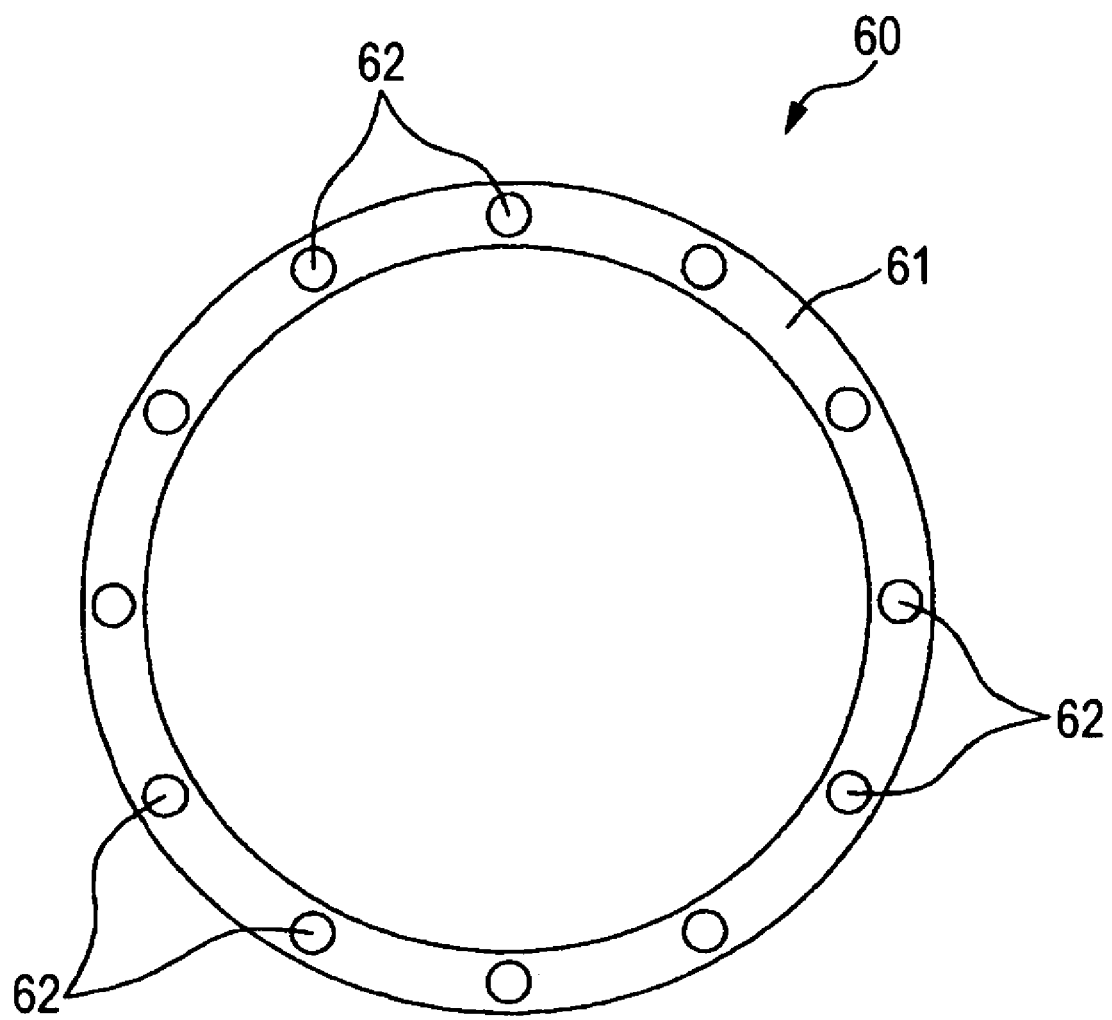
FIG. 5 is a plan view of a second urging member.
Figure 6A:
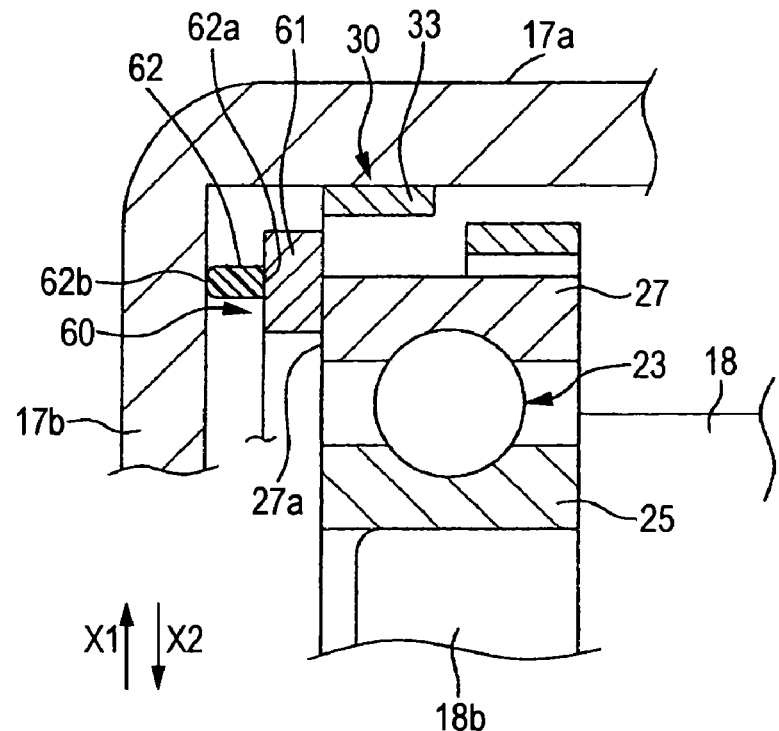
FIGS. 6A and 6B are sectional views of major portions of the electric power steering system illustrating the operation of the second urging member before and after the worm shaft is displaced toward the worm wheel by the first urging member.

Referring to FIG. 5, the elastic pins 62 are arranged in the circumferential direction of the support member 61. Referring to FIG. 6A which is an enlarged view, the elastic pins 62 have fixed ends 62a fixed to the support member 6 and free ends 62b brought into elastic contact with the end wall 17b of the housing 17a which serves as the opposing member. The free ends 62b are formed in a round shape such as a semi-spherical shape.

Figure 6B:
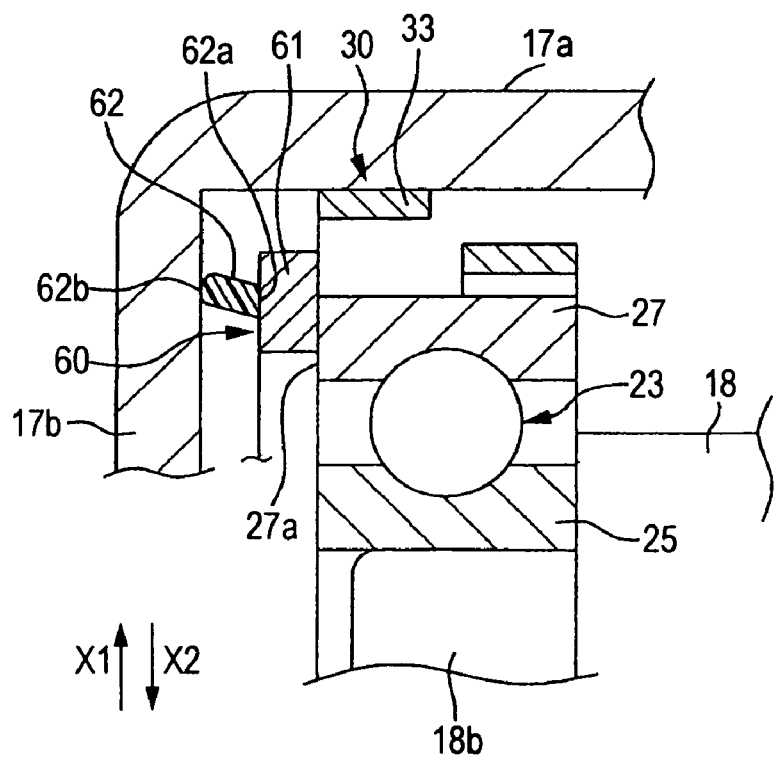

Referring, for example, to FIG. 6B, when the second bearing 23 is displaced together with the second end portion 18b of the worm shaft 18 in the direction X2 in which the distance D1 between the centers is shortened due to the work of the curved leaf spring 30 which is the first urging member, the support member 61 of the second urging member 60 moves together with the outer wheel 27 of the second bearing 23. Therefore, the elastic pins 62 are bent in a manner that the fixed ends 62a of the elastic pins 62 and the free ends 62b thereof are deviated in the directions X1, X2 in which the distance D1 between the centers is lengthened or shortened. Here, however, the elastic pins 62 are subject to be easily bent. Therefore, the elastic pins 62 do not impair the work of the curved leaf spring 30 which is the first urging member. Further, since the free ends 62b of the elastic pins 62 are formed round, the elastic pins 62 can be bent with a decreased load.

On the other hands the outer wheel 26 of the first bearing 22 is positioned in the axial direction by being pushed onto a positioning step 17c of the housing 17a due to a threaded member 38 for adjusting the pre-load and for adjusting the backlash, that is screwed into a threaded hole 37 continuous to the corresponding bearing-holding hole 28. Therefore, the urging force of the elastic pins 62 of the second urging member 60 contributes to giving a pre-load to the first and second bearings 22, 23 at one time and, further, contributes to preventing a play of the first urging member 30 in the axial direction of the worm shaft 18. Further, the urging force of the second urging member 60 contributes to removing the backlash between the worm shaft 18 and the worm wheel 19.

Next, the power transmission joint 21 will be described in detail with reference to FIG. 7 which is a sectional view along the line VII-VII in FIG. 2 and FIG. 8 which is a disassembled perspective view. Referring, first, to FIG. 2, the power transmission joint 21 includes a first engaging member 41 coupled to the output shaft 20 of the electric motor 16 so as to rotate integrally therewith, a second engaging member 42 coupled to the first end 18a of the worm shaft 18 which is the input shaft of the reduction gear 17, and an elastic member 43 interposed between the first engaging member 41 and the second engaging member 42 to transmit torque between the two members 41 and 42.

The first and second engaging members 41, 42 are made of, for example, a metal. The elastic member 43 is made of, for example, a synthetic rubber or a synthetic resin such as polyurethane.

Figure 7:
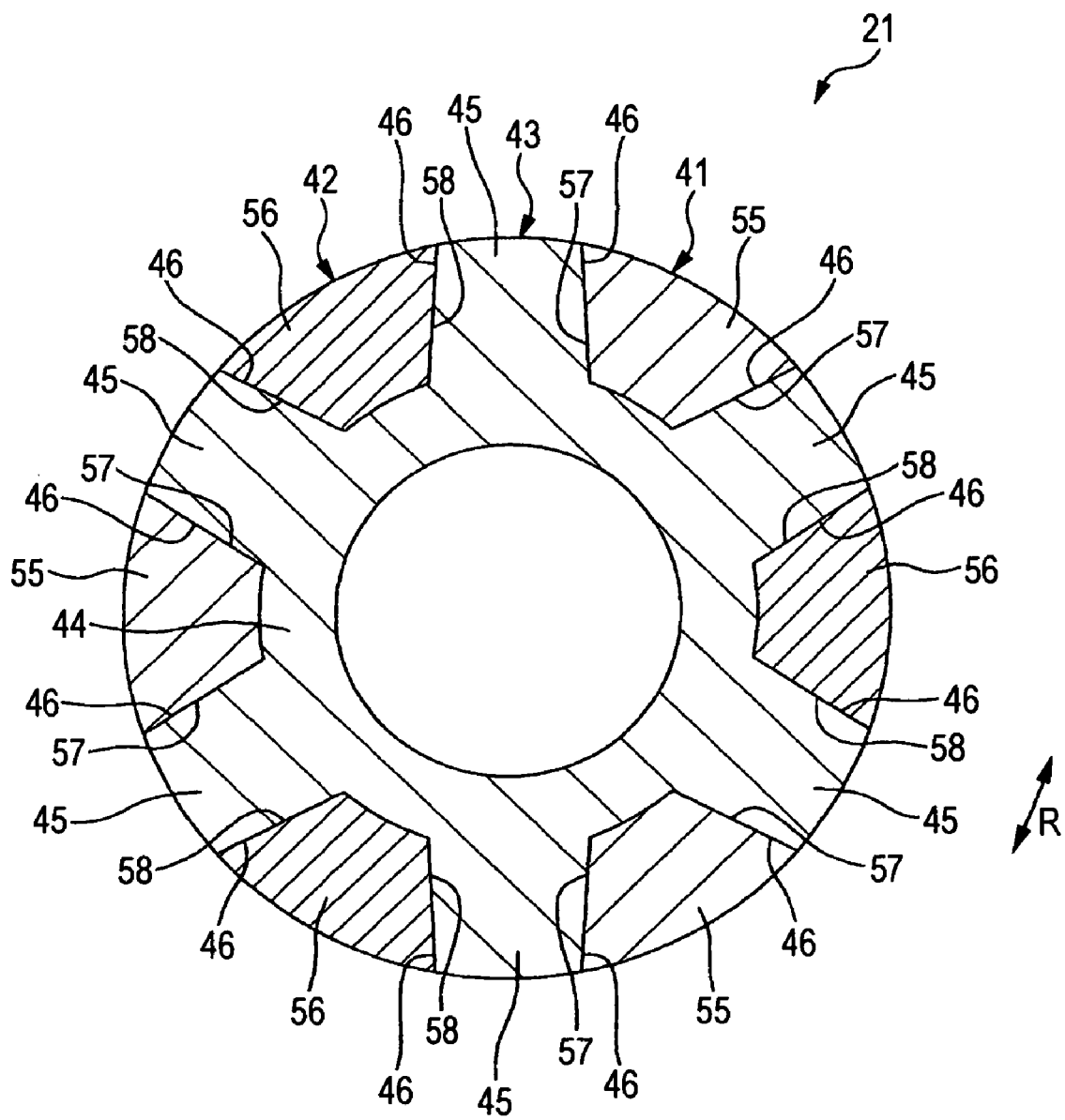
FIG. 7 is a sectional view along the line VII-VII in FIG. 2.
Figure 8:
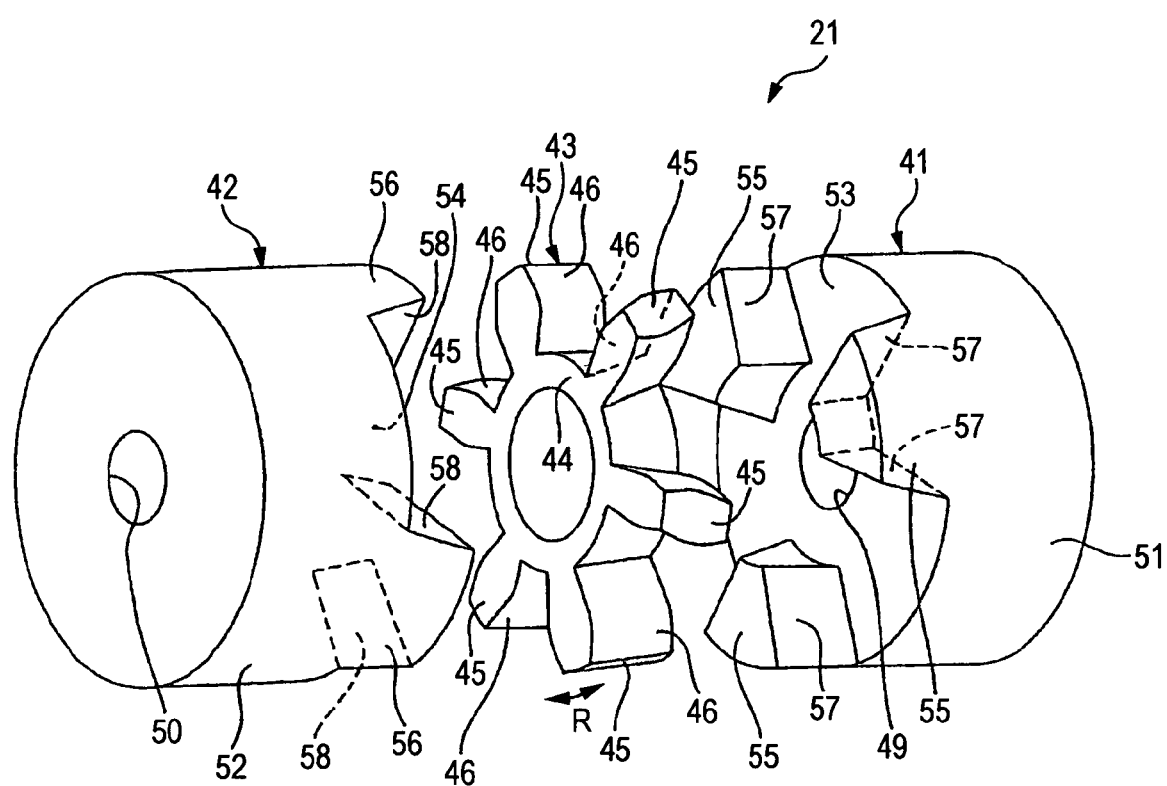
FIG. 8 is a disassembled perspective view of a power transmission joint.

Referring, next, to FIGS. 7 and 8, the elastic member 43 includes an annular main portion 44 and a plurality of engaging arms 45 extending in a radial direction from the main portion 44. The plurality of engaging arms 45 are arranged in the circumferential direction R of the main portion 44 maintaining an equal distance. Each engaging arm 45 has a pair of power transmission surfaces 46 facing in the circumferential direction R.

Referring to FIG. 8, the first and second engaging members 41, 42 include, respectively, annular main portions 51, 52 forming engaging holes 49, 50 for engaging the output shaft 20 and the worm shaft 18 together, and a plurality of first and second engaging projections 55, 56 projecting on the opposing surfaces 53, 54 of the main portions 51, 52.

The first and second engaging projections 55, 56 of the first and second engaging members 41, 42 are arranged in the circumferential direction of the corresponding main portions 51, 52 maintaining an equal distance.

Referring to FIG. 7 illustrating a state where the power transmission joint 21 is assembled, the first and second engaging projections 55, 56 of the first and second engaging members 41, 42 are alternately arranged in the circumferential direction, and the corresponding engaging arms 45 of the elastic member 43 are held between the first and second engaging projections 55, 56 neighboring each other in the circumferential direction. In other words, the first and second engaging projections 55, 56 neighboring in the circumferential direction are in mesh with each other holding therebetween the corresponding engaging arms 45 of the elastic member 43 in the circumferential direction.

Referring to FIGS. 7 and 8, further, the first and second engaging projections 55 and 56 include power transmission surfaces 57, 58 for transmitting power to the corresponding engaging arms 45 of the elastic member 43.

According to this embodiment, the second end 18b of the worm shaft 18 can be urged in the direction X2 in which the distance D1 between the centers is shortened due to the elastic restoring force of the curved leaf spring 30 which is the first urging member and, hence, the amount of backlash can be decreased in the portion where the worm shaft 18 and the worm wheel 19 are in mesh together. As a result, the noise due to the teeth-hitting sound can be decreased.

By suppressing the play of the worm shaft 18 in the axial direction relying upon the second urging member 60, further, the play of the worm shaft 18 in the axial direction is suppressed by the curved leaf spring 30. This prevents the drop of durability of the curved leaf spring 30 caused by the play of the curved leaf spring 30 and suppresses the generation of noise stemming from the hitting sound. It is further made possible to suppress a change in the rotational torque of the worm shaft 18.

In particular, the elastic pins 62 of the second urging member 60 are subject to be easily bent. Therefore, the elastic pins 62 do not interrupt the second end 18b of the worm shaft 18 from being displaced by the curved leaf spring 30 in the directions X1, X2 in which the distance D1 between the centers is lengthened or shortened. Therefore, the backlash is reliably suppressed, and noise stemming from the teeth-hitting sound can be reliably decreased. It is further made possible to suppress a change in the rotational torque of the worm shaft 18.

Figure 9:
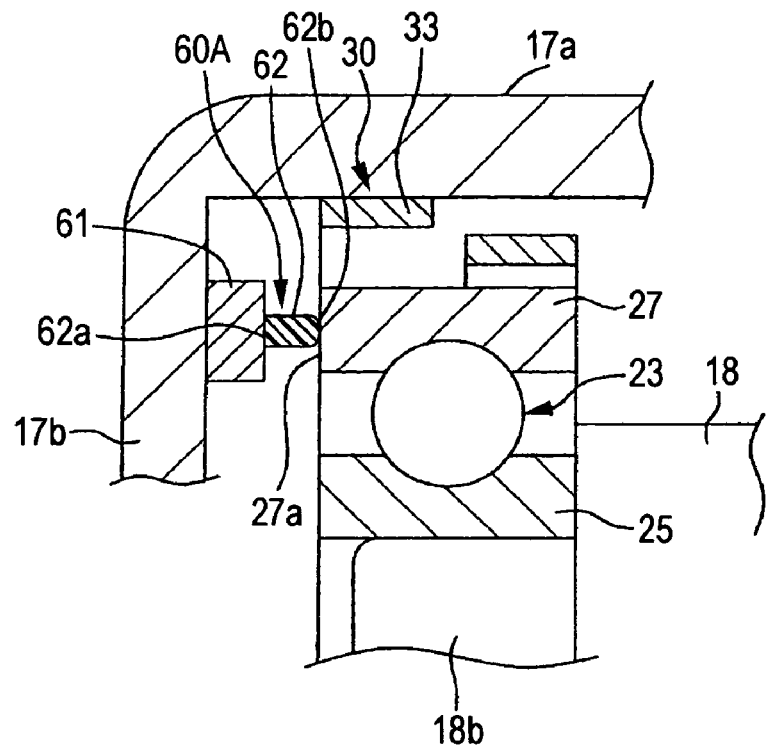
FIG. 9 is a sectional view illustrating a major portion of the electric power steering system according to another embodiment of the invention.

Next, FIG. 9 illustrates another embodiment of the invention. Referring to FIG. 9, what makes this embodiment different from the embodiment of FIG. 6A is that a second urging member 60A is used in place of the second urging member 60. The support member 61 of the second urging member 60A is received by the end wall 17b of the housing 17a which is the opposing member, and the free ends 62b of the elastic pins 62 of the second urging member 60A are brought into elastic contact with the end surface 27a of the outer wheel 27 of the second bearing 23. This embodiment also exhibits the same effect as that of the embodiment of FIG. 6A.

Figure 10:
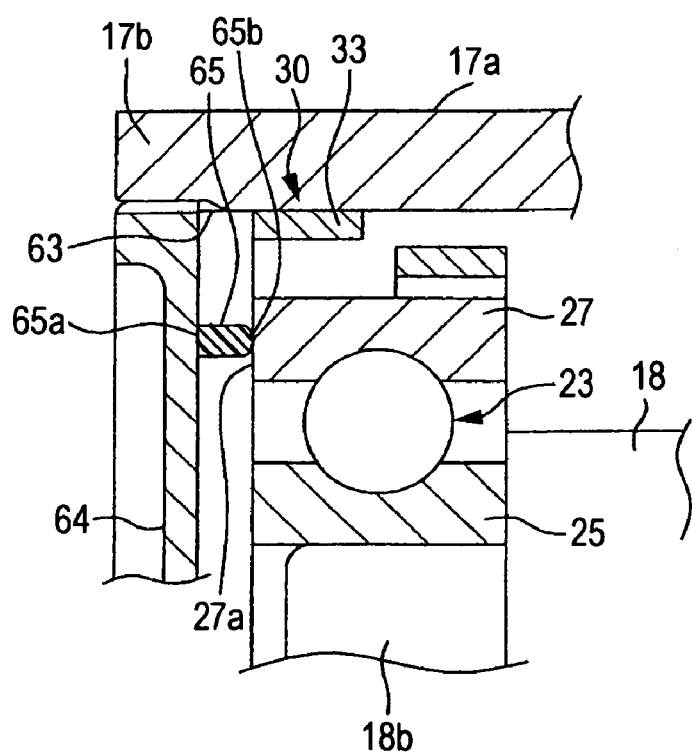
FIG. 10 is a sectional view illustrating a major portion of the electric power steering system according to a further embodiment of the invention.

FIG. 10 illustrates a further embodiment of the invention. Referring to FIG. 10, an opening 63 is formed in the end wall 17b of the housing 17a, and is closed by a disk-shape covering member 64.

In this embodiment, the plurality of elastic pins 65 serving as the second urging member for elastically urging the second bearing 23 in the axial direction, are interposed between the end surface 27a of the outer wheel 27 of the second bearing 23 and the covering member 64 which is an opposing member opposed thereto.

The plurality of elastic pins 65 are arranged in the circumferential direction of the covering member 64. The elastic pins 65 have fixed ends 65a fixed to the covering member 64 and free ends 65b that come into elastic contact with the end surface 27a of the outer wheel 27 of the second bearing 23. This embodiment also exhibits the same effect as that of the embodiment of FIG. 6A.

The invention is not limited to the above embodiments only and may, further, employ, for example, a plain bearing as the second bearing 23. Further, there may be used a bevel gear or a hypoid gear as a reduction gear 17 which serves as the transmission device.

The invention claimed is:

1. An electric power steering system which transmits power of an electric motor for assisting a steering to a steering mechanism via a transmission device that includes a drive gear and a driven gear in mesh with the drive gear, the electric power steering system comprising:
a bearing that rotatably supports an end of the drive gear in an axial direction thereof;
a housing that includes a support hole for supporting the bearing in such a manner to be deviated in a direction in which a distance between an axial center of drive gear and an axial center of the driven gear varies;
a first urging member that elastically urges the drive gear via the bearing in a direction in which the distance between the axial centers of the drive gear and the driven gear is shortened; and
a second urging member that includes a plurality of elastic pins arranged in a circumferential direction of the bearing for elastically urging the bearing in the axial direction.

2. The electric power steering system according to claim 1, wherein the second urging member includes an annular support member, and the elastic pins have fixed ends fixed to the support member and free ends.

3. The electric power steering system according to claim 2, wherein the second urging member including the annular support member and the elastic pins is interposed between an end surface of the bearing and an opposed portion of the housing opposed to the bearing.

4. The electric power steering system according to claim 3, wherein the support member is received by the end surface of the bearing, and the free ends of the elastic pins are brought into elastic contact with the opposed portion.

5. The electric power steering system according to claim 3, wherein the support member is received by the opposed portion, and the free ends of the elastic pins are brought into elastic contact with the end surface of the bearing.

6. The electric power steering system according to claim 1 further comprising a disk-shape covering member for closing an opening formed in the housing,
wherein the elastic pins have fixed ends fixed to the covering member and free ends that come into elastic contact with the end surface of the bearing.

7. The electric power steering system according to claim 1, wherein the free ends of the elastic pins are of a round shape.

* * * * *